United States Patent
Kodera

(10) Patent No.: US 11,691,663 B2
(45) Date of Patent: Jul. 4, 2023

(54) STEERING CONTROL DEVICE

(71) Applicant: JTEKT CORPORATION, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 205 days.

(21) Appl. No.: 17/187,939

(22) Filed: Mar. 1, 2021

(65) Prior Publication Data

US 2021/0276610 A1    Sep. 9, 2021

(30) Foreign Application Priority Data

Mar. 9, 2020 (JP) ................. 2020-039935

(51) Int. Cl.
*B62D 5/04* (2006.01)
*B62D 6/00* (2006.01)

(52) U.S. Cl.
CPC ............. *B62D 5/046* (2013.01); *B62D 6/00* (2013.01)

(58) Field of Classification Search
CPC .................................................. B62D 5/046
See application file for complete search history.

(56) References Cited

U.S. PATENT DOCUMENTS

| 10,392,048 B2 | 8/2019 | Sasaki et al. |
| 2017/0274929 A1* | 9/2017 | Sasaki ............. B62D 5/04 |
| 2020/0382032 A1* | 12/2020 | Takase ............. H02P 27/08 |
| 2022/0063710 A1* | 3/2022 | Tsubaki ............. B62D 6/00 |

FOREIGN PATENT DOCUMENTS

| JP | 2013038856 A | * | 2/2013 |
| JP | 2014213781 A | * | 11/2014 ........... B62D 5/04 |
| JP | 2019-131072 A | | 8/2019 |

OTHER PUBLICATIONS

Aug. 17, 2021 Search Report issued in European Patent Application No. 21160646.2.

* cited by examiner

*Primary Examiner* — Jeff A Burke
*Assistant Examiner* — Jerrod Irvin Davis
(74) *Attorney, Agent, or Firm* — Oliff PLC

(57) ABSTRACT

A steering control device controls a steering device that includes an electric motor. The steering control device includes a control unit configured to control an operation of the steering device by controlling the electric motor. The control unit is configured to calculate a control value for controlling the electric motor, to calculate a predetermined component indicating characteristics of the steering device using a value of a variable associated with the control value as an input, and to determine whether a mechanical abnormality has occurred in the steering device based on the calculated predetermined component.

5 Claims, 10 Drawing Sheets

STEERING CONTROL DEVICE

CROSS-REFERENCE TO RELATED APPLICATION

This application claims priority to Japanese Patent Application No. 2020-039935 filed on Mar. 9, 2020, incorporated herein by reference in its entirety.

BACKGROUND

1. Technical Field

The disclosure relates to a steering control device.

2. Description of Related Art

For example, Japanese Unexamined Patent Application Publication No. 2019-131072 (JP 2019-131072 A) discloses an example of a so-called steer-by-wire steering device which is used for a vehicle and which includes a steering wheel that can be displaced without transmitting power to turning wheels.

SUMMARY

In such a steer-by-wire steering device, higher reliability is required. However, this requirement for high reliability in a steering device is not limited to a steer-by-wire steering device, and is the same for a steering device including a steering wheel which can be displaced to transmit power to turning wheels.

The disclosure provides a steering control device that can appropriately detect a mechanical abnormality of a steering device.

According to an aspect of the disclosure, there is provided a steering control device that controls a steering device that turns turning wheels of a vehicle and includes an electric motor. The steering control device includes a control unit configured to control an operation of the steering device by controlling the electric motor. The control unit is configured to perform a control value calculating process of calculating a control value for controlling the electric motor, a predetermined component calculating process of calculating a predetermined component indicating characteristics of the steering device which are exhibited by controlling the electric motor using a value of a variable associated with the control value as an input, and an abnormality state determining process of determining whether a mechanical abnormality has occurred in the steering device based on the predetermined component calculated in the predetermined component calculating process.

According to this aspect, it is possible to detect characteristics of the steering device which are exhibited by controlling the electric motor using the predetermined component included in the control value which is calculated in controlling the electric motor. These characteristics exhibit, for example, different characteristics that a stickiness component is excessively large or excessively small when there is a mechanical abnormality in the steering device more in contrast with when there is no mechanical abnormality in the steering device. This is valid in a state before an abnormality has been reached such as a state in which a mechanical abnormality has not actually occurred in the steering device and an abnormality cannot be determined even when a mechanical part of the steering device is directly monitored. That is, with this configuration, based on the characteristics exhibited by the predetermined component, it is possible to indirectly detect a mechanical abnormality of the steering device and to detect an abnormality which cannot be detected even when a mechanical part of the steering device is directly monitored. Accordingly, before a state in which it is difficult to operate the steering device has been reached, it is possible to appropriately detect a mechanical abnormality of the steering device including a symptom thereof.

In the aspect, the predetermined component calculating process may include a disturbance torque calculating process of using a value of a variable associated with a torque which is output from the electric motor and a value of a state variable of the steering device which changes by controlling the electric motor as the value of the variable associated with the control value and calculating a torque component which affects the state variable other than the torque output from the electric motor as a disturbance torque.

With this configuration, it is possible to calculate the predetermined component using the disturbance torque calculating process in consideration of the fact that the predetermined component is included in a torque component affecting the state variable of the steering device which changes by controlling the electric motor in addition to the torque output from the electric motor.

In the aspect, the predetermined component calculating process may include a filtering process of using the disturbance torque as an input and selectively transmitting a specific frequency component of the disturbance torque, and may use an output of the filtering process as the predetermined component.

With this configuration, by using the output of the filtering process as the predetermined component in consideration of the fact that the predetermined component becomes significant at a predetermined frequency, it is possible to accurately calculate a target component by adjusting a specific frequency component to a frequency at which the target component increases particularly.

In the aspect, the filtering process may include an intensity changing process of changing an intensity of the output of the filtering process depending on a temperature of the steering device but with the same input of the filtering process.

The intensity of the predetermined component changes depending on the temperature of the steering device. Accordingly, even when the intensity changing process is not performed unlike the aforementioned configuration, the intensity of the output of the filtering process changes depending on the temperature of the steering device. In the aforementioned configuration, the intensity of the output of the filtering process is intentionally changed depending on the temperature of the steering device. Accordingly, it is possible to easily enhance a degree of freedom in determination accuracy using the abnormality state determining process based on the output of the filtering process in comparison with a case in which the intensity changing process is not used.

In the aspect, the predetermined component calculating process may include a stickiness component calculating process of calculating a stickiness component of the steering device as the predetermined component. With this configuration, in consideration of the fact that the stickiness component exhibits different characteristics when there is a mechanical abnormality in the steering device in comparison with a case in which there is no abnormality, the stickiness component is calculated using the value of the variable associated with the control value for the electric motor as an input. Accordingly, it is possible to appropriately detect a mechanical abnormality of the steering device.

In the aspect, the predetermined component calculating process may include a friction component calculating process of calculating a friction component of the steering device as the predetermined component. With this configuration, in consideration of the fact that the friction component exhibits different characteristics when there is a mechanical abnormality in the steering device in comparison with a case in which there is no abnormality, the friction component is calculated using the value of the variable associated with the control value for the electric motor as an input. Accordingly, it is possible to appropriately detect a mechanical abnormality of the steering device.

In the aspect, the predetermined component calculating process may include an inertia component calculating process of calculating an inertia component of the steering device as the predetermined component. With this configuration, in consideration of the fact that the inertia component exhibits different characteristics when there is a mechanical abnormality in the steering device in comparison with a case in which there is no abnormality, the inertia component is calculated using the value of the variable associated with the control value for the electric motor as an input. Accordingly, it is possible to appropriately detect a mechanical abnormality of the steering device.

With the steering control device according to the aspect, it is possible to appropriately detect a mechanical abnormality of a steering device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a first embodiment in which a steering control device is applied to a steer-by-wire steering device will be described with reference to the accompanying drawings.

Figure 1:
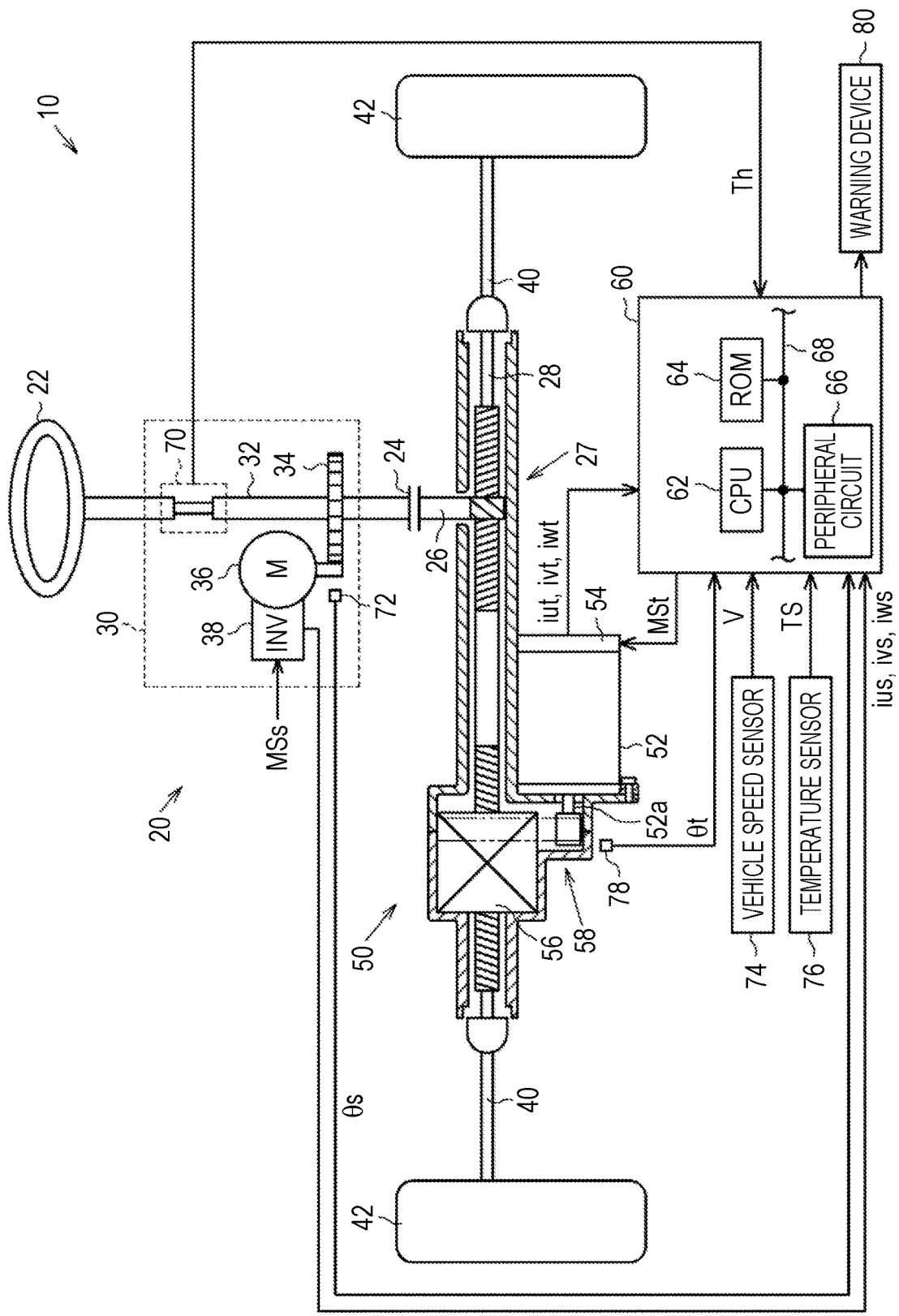
FIG. 1 is a diagram illustrating a steering device according to a first embodiment.

As illustrated in FIG. 1, a steering device 10 includes a steering mechanism 20, a turning actuator 50 that turns turning wheels 42, and the turning wheels 42. The steering mechanism 20 includes a steering wheel 22, a drag force actuator 30 that applies a drag force which is a force against a driver's operation of the steering wheel 22, a rack and pinion mechanism 27, and a clutch 24 that is interposed between an input shaft 32 rotating integrally with the steering wheel 22 and the rack and pinion mechanism 27.

The drag force actuator 30 includes an input shaft 32, a reduction gear 34, a steering-side electric motor 36, and an inverter 38, and applies power of the steering-side electric motor 36 to the input shaft 32 via the reduction gear 34. In this embodiment, a three-phase surface permanent magnet synchronous motor (SPMSM) is exemplified as the steering-side electric motor 36. The rack and pinion mechanism 27 includes a pinion shaft 26 which is mechanically connected to the input shaft 32 via the clutch 24 and a rack shaft 28, and converts a rotational force of the pinion shaft 26 to a displacement in an axial direction of the rack shaft 28. The clutch 24 transmits power of the input shaft 32 to the pinion shaft 26 in an engaged state, and cuts off transmission of power between the input shaft 32 and the pinion shaft 26 in a disengaged state. In the engaged state of the clutch 24, a rotational force of the steering wheel 22 is converted to a displacement in the axial direction of the rack shaft 28, and this displacement in the axial direction is transmitted to the turning wheels 42 via tie rods 40 connected to both ends of the rack shaft 28, whereby a turning angle of the turning wheels 42 is changed.

On the other hand, the turning actuator 50 shares the rack shaft 28 with the steering mechanism 20 and includes a turning-side electric motor 52, an inverter 54, a ball screw mechanism 56, and a belt reduction gear mechanism 58. The turning-side electric motor 52 is a power source for turning the turning wheels 42, and a three-phase surface permanent magnet synchronous motor (SPMSM) is exemplified as the turning-side electric motor 52 in this embodiment. The ball screw mechanism 56 is attached integrally around the rack shaft 28, and the belt reduction gear mechanism 58 transmits a rotational force of an output shaft 52a of the turning-side electric motor 52 to the ball screw mechanism 56. The rotational force of the output shaft 52a of the turning-side electric motor 52 is converted to a force for linearly moving the rack shaft 28 in the axial direction thereof via the belt reduction gear mechanism 58 and the ball screw mechanism 56. The turning wheels 42 can be turned by a force in the axial direction applied to the rack shaft 28.

A steering control device 60 operates the turning actuator 50 such that a turning angle which is a control value for the steering device 10 is controlled. The steering control device 60 operates the drag force actuator 30 such that a drag force which is a control value for the steering device 10 is controlled while keeping the clutch 24 in the disengaged state. The steering control device 60 refers to a steering torque Th which is detected by a torque sensor 70 and which is a torque input via the steering wheel 22 by a driver, a rotational angle θs of a rotation shaft of the steering-side electric motor 36 which is detected by a steering-side rotational angle sensor 72, or a vehicle speed V which is detected by a vehicle speed sensor 74. The steering control device 60 also refers to a temperature TS of the steering device 10 which is detected by a temperature sensor 76 or a rotational angle θt of the output shaft 52*a* which is detected by a rotational angle sensor 78. Here, the temperature TS may be the temperature of the turning-side electric motor 52, the temperature of the steering-side electric motor 36, the temperature of the inverter 54 or 38, the temperature of the ball screw mechanism 56, or the like. The temperature TS can be the temperature of the ball screw mechanism 56 in order to take into account an influence of stickiness based on grease. Above all, since the temperature sensor 76 is attached to the steering control device 60 and the steering control device 60 is located in the vicinity of the steering device 10, the temperature of the steering control device 60 may be considered as the temperature of the steering device 10. The steering control device 60 also refers to currents ius, ivs, and iws flowing in the steering-side electric motor 36 or currents iut, ivt, and iwt flowing in the turning-side electric motor 52. The currents ius, ivs, and iws can be detected using voltage drops in shunt resistors provided in legs of the inverter 38, and the currents iut, ivt, and iwt can be detected using voltage drops in shunt resistors provided in legs of the inverter 54.

The steering control device 60 operates a warning device 80 in order to warn a driver of occurrence of a mechanical abnormality of the turning actuator 50. Here, the warning device 80 is provided in, for example, an instrument panel in a vehicle. The warning device 80 is turned on or off to warn a driver. A mechanical abnormality of the turning actuator 50 (hereinafter referred to as "mechanical abnormality") includes a state in which a smooth operation of the belt reduction gear mechanism 58 is difficult, for example, a symptomatic state which is a state in which a smooth operation of the belt reduction gear mechanism 58 is difficult when the mechanical abnormality is left alone in addition to a state in which tooth fall-out occurs, belt breakage occurs, or the rack shaft 28 is locked.

The steering control device 60 includes a CPU 62, a ROM 64, and a peripheral circuit 66, which are communicatively connected to each other via a local network 68. The peripheral circuit 66 includes a circuit that generates a clock signal for defining internal operations, a power supply circuit, and a reset circuit. In this embodiment, the CPU 62 is an example of a control unit.

Figure 2:
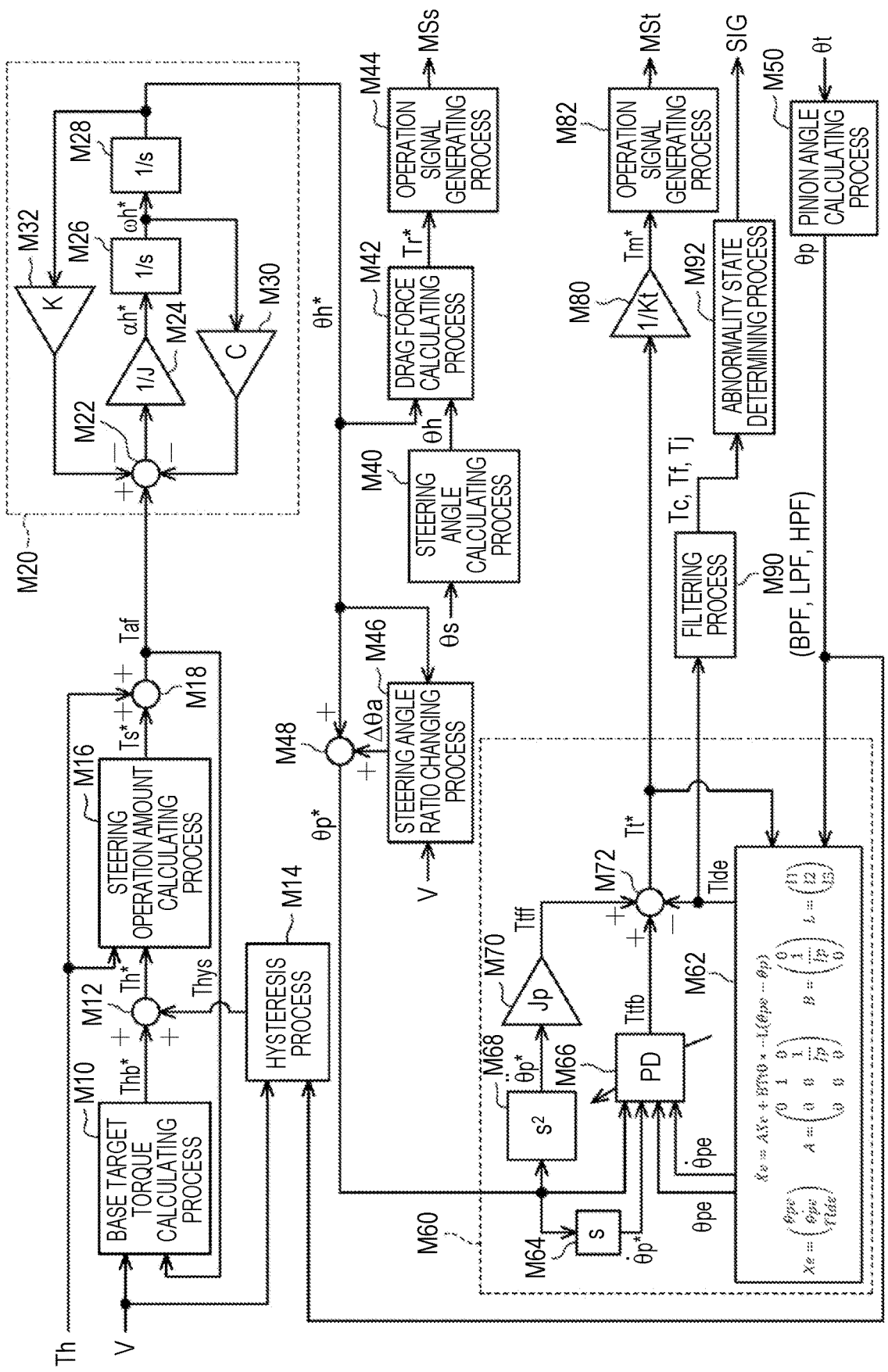
FIG. 2 is a block diagram illustrating processes which are performed by a steering control device according to the first embodiment.

FIG. 2 illustrates some processes which are performed by the steering control device 60. The processes illustrated in FIG. 2 are realized by causing the CPU 62 to execute a program stored in the ROM 64. The processes illustrated in FIG. 2 are processes when the clutch 24 is in the disengaged state.

A base target torque calculating process M10 is a process of calculating a base target torque Thb* which is a base value of a target steering torque Th* which is to be input to the input shaft 32 via the steering wheel 22 by a driver based on an axial force Taf which will be described later. Here, the axial force Taf is a force in an axial direction which is applied to the rack shaft 28. Since the axial force Taf has a value corresponding to a lateral force acting on the turning wheels 42, the lateral force can be ascertained from the axial force Taf. On the other hand, a torque which is to be input to the input shaft 32 via the steering wheel 22 by a driver is preferably determined based on the lateral force. Accordingly, the base target torque calculating process M10 is a process of calculating the base target torque Thb* based on the lateral force which is ascertained from the axial force Taf.

Specifically, the base target torque calculating process M10 is a process of calculating the absolute value of the base target torque Thb* to be less when the absolute value of the axial force Taf is the same and the vehicle speed V is low than when the vehicle speed V is high. This can be realized, for example, by causing the CPU 62 to map-calculate the base target torque Thb* in a state in which map data with the axial force Taf or a lateral acceleration which is ascertained from the axial force Taf and the vehicle speed V as input variables and with the base target torque Thb* as an output variable is stored in the ROM 64 in advance. Here, map data is pair data of discrete values of the input variables and values of the output variables corresponding to the values of the input variables. For example, the map calculation is a process of outputting the value of the corresponding output variable of the map data as a result of calculation when a value of one input variable matches one of the values of the input variables of the map data and outputting a value obtained by interpolation of values of a plurality of output variables included in the map data as a result of calculation when the value of one input variable does not match any value of the input variables.

An addition process M12 is a process of calculating the target steering torque Th* by adding a hysteresis correction amount Thys to the base target torque Thb*. A hysteresis process M14 is a process of calculating and outputting the hysteresis correction amount Thys for correcting the base target torque Thb* based on a pinion angle θp which is a convertible angle which can be converted to the turning angle of the turning wheels 42. Specifically, the hysteresis process M14 includes a process of identifying turning steering and return steering of the steering wheel 22 based on a change of the pinion angle θp or the like and calculating the hysteresis correction amount Thys such that the absolute value of the target steering torque Th* is greater at the time of turning steering than at the time of return steering. Specifically, the hysteresis process M14 includes a process of setting the hysteresis correction amount Thys to be variable according to the vehicle speed V. The pinion angle θp is a rotational angle of the pinion shaft 26.

A steering operation amount calculating process M16 is a process of calculating a steering operation amount Ts* which is an operation amount for controlling a steering torque Th such that it becomes the target steering torque Th* by feedback control. The steering operation amount Ts* is an amount including an operation amount for controlling the steering torque Th such that it becomes the target steering torque Th* by feedback control and may include a feed-forward term. The steering operation amount Ts* is an amount converted to a torque which is required to be applied to the input shaft 32 in feedback control of the steering torque Th such that it becomes the target steering torque Th*.

An axial force calculating process M18 is a process of calculating the axial force Taf by adding the steering torque Th to the steering operation amount Ts*. Since the steering torque Th is a torque which is applied to the input shaft 32, the axial force Taf in this embodiment has a value obtained by converting a force which is applied to the rack shaft 28 in the axial direction to a torque which is applied to the input shaft 32 when it is assumed that the clutch 24 is in the engaged state.

A normative model calculating process M20 is a process of calculating a steering angle command value θh* which is a command value of the steering angle θh based on the axial force Taf. Specifically, the normative model calculating process M20 is a process of calculating the steering angle command value θh* using a model formula which is expressed by Expression (c1).

$$Taf = K \cdot \theta h^* + C \cdot \theta h^{*\prime} + J \cdot \theta h^{*\prime\prime} \quad (c1)$$

The model expressed by Expression (c1) is a model of a value which is indicated by the steering angle θh when the same amount of torque as the axial force Taf is input to the input shaft 32 while the clutch 24 is in the engaged state. In Expression (c1), a stickiness coefficient C is a model of stickiness of the steering device 10 or the like, an inertia coefficient J is a model of inertia of the steering device 10, and an elasticity coefficient K is a model of specifications such as suspension and wheel alignment of a vehicle in which the steering device 10 is mounted. This model is not a model that accurately expresses the actual steering device 10, but is a normative model which is designed to change behavior of the steering angle in response to an input to ideal behavior. In this embodiment, it is possible to adjust a feeling of steering by designing a normative model.

Specifically, in a subtraction process M22, a stickiness term "C·θh*'" and a spring term "K·θh*" are subtracted from the axial force Taf. In an inertia coefficient dividing process M24, the output of the subtraction process M22 is divided by the inertia coefficient J, whereby a steering angular acceleration command value αh* (=θh*") is calculated. Then, in an integration process M26 with the steering angular acceleration command value αh* as an input, a steering angular velocity command value ωh* (=θh*') is calculated. In an integration process M28 with the steering angular velocity command value ωh* as an input, the steering angle command value θh* is calculated.

A stickiness coefficient multiplying process M30 is a process of calculating the stickiness term "C·θh*'" by multiplying the steering angular velocity command value ωh* by the stickiness coefficient C. An elasticity coefficient multiplying process M32 is a process of calculating the spring term "K·θh*" by multiplying the steering angle command value θh* by the elasticity coefficient K.

A steering angle calculating process M40 is a process of calculating a steering angle θh which is a rotational angle of the steering wheel 22 based on the process of integrating the rotational angle θs. A drag force calculating process M42 is a process of calculating a command value for a torque of the steering-side electric motor 36 which is an operation amount for controlling the steering angle θh such that it becomes the steering angle command value θh* in a feedback manner as a drag force command value Tr*. An operation signal generating process M44 is a process of generating an operation signal MSs for operating the inverter 38 and outputting the generated operation signal MSs to the inverter 38 to control a torque which is a control value of the steering-side electric motor 36 such that it becomes the drag force command value Tr*. Specifically, the operation signal generating process M44 is a process of operating an output line voltage of the inverter 38 using an operation amount for controlling the currents ius, ivs, and iws flowing in the steering-side electric motor 36 to current command values determined by the drag force command value Tr* in a feedback manner.

A steering angle ratio changing process M46 is a process of setting an adjustment amount Δθa for changing a steering angle ratio which is a ratio of the pinion angle command value θp* to the steering angle command value θh* such that it varies based on the vehicle speed V. Specifically, the adjustment amount Δθa is set such that the change of the pinion angle command value θp with respect to the change of the steering angle command value θh* * is greater when the vehicle speed V is low than when the vehicle speed V is high. An addition process M48 sets the pinion angle command value θp* by adding the adjustment amount 40a to the steering angle command value θh*.

A pinion angle calculating process M50 is a process of calculating a pinion angle θp based on the process of integrating the rotational angle θt of the turning-side electric motor 52. The pinion angle θp represents a forward traveling direction when it is "0" and represents a right turning angle or a left turning angle depending on whether it is positive or negative.

A turning operation amount calculating process M60 is a process of calculating a turning operation amount Tt* which is an operation amount for controlling the pinion angle θp such that it becomes the pinion angle command value θp* in a feedback manner. The turning operation amount Tt* is an amount corresponding to a required torque for the turning-side electric motor 52 in feedback control of the pinion angle θp such that it becomes the pinion angle command value θp*, and is an amount which is converted to a torque which is applied to the pinion shaft 26 when the torque is assumed to be applied to the pinion shaft 26 in this embodiment.

The turning operation amount calculating process M60 includes a disturbance torque calculating process M62 of estimating a torque affecting the pinion angle θp which is a state variable of the steering device 10 and which is changed by controlling the turning-side electric motor 52 as a disturbance torque in addition to the turning operation amount Tt* and setting the estimated torque as an estimated disturbance torque Tlde. In this embodiment, the estimated disturbance torque Tlde is converted to a torque which is applied to the pinion shaft 26 when the disturbance torque is assumed to be applied to the pinion shaft 26.

The disturbance torque calculating process M62 calculates the estimated disturbance torque Tlde or an estimated value θpe by Expression (c2) using an inertia coefficient Jp, the pinion angle θp, the turning operation amount Tt*, and a matrix L of three rows and one column for defining observer gains 11, 12, and 13. The inertia coefficient Jp is a model of an inertia of the steering device 10 and represents the actual inertia of the steering device 10 with higher accuracy than that of the inertia coefficient J. In this embodiment, the disturbance torque calculating process M62 is an example of a predetermined component calculating process.

$$\dot{X}e = AXe + BTi0 \cdot -L(\theta pe - \theta p) - (c2)$$

$$Xe = \begin{pmatrix} \theta pe \\ \dot{\theta} pe \\ \text{Tlde} \end{pmatrix} \quad A = \begin{pmatrix} 0 & 1 & 0 \\ 0 & 0 & \frac{1}{Jp} \\ 0 & 0 & 0 \end{pmatrix} \quad B = \begin{pmatrix} 0 \\ \frac{1}{Jp} \\ 0 \end{pmatrix} \quad L = \begin{pmatrix} l1 \\ l2 \\ l3 \end{pmatrix}$$

A differential calculating process M64 is a process of calculating a pinion angular velocity command value by a differential calculation of the pinion angle command value θp*.

A feedback term calculating process M66 is a process of calculating a feedback term Ttfb which is a sum of a proportional term based on a difference between the pinion angle command value θp* and the estimated value θpe and a differential term based on a difference between a first-order time differential value of the pinion angle command value θp* and a first-order differential value of the estimated value θpe.

A second-order differentiation process M68 is a process of calculating a second-order time differential value of the pinion angle command value θp*. A feed-forward term calculating process M70 is a process of calculating a feed-forward term Ttff by multiplying an output value of the second-order differentiation process M68 by the inertia coefficient Jp. A two-degree-of-freedom operation amount calculating process M72 is a process of calculating the turning operation amount Tt* by subtracting the estimated disturbance torque Tlde from a sum of the feedback term Ttfb and the feed-forward term Ttff. In this embodiment, the turning operation amount calculating process M60 is an example of a control value calculating process and a predetermined component calculating process.

A conversion process M80 is a process of converting the turning operation amount Tt* to a torque command value Tm* which is a command value for a torque as a control value for the turning-side electric motor 52 by dividing the turning operation amount Tt* by a reduction gear ratio Kt.

An operation signal generating process M82 is a process of generating and outputting an operation signal MSt of the inverter 54 for controlling the torque for the turning-side electric motor 52 to the torque command value Tm*. Specifically, the operation signal generating process M82 is a process of operating an output line voltage of the inverter 54 using an operation amount for controlling the currents iut, ivt, and iwt flowing in the turning-side electric motor 52 to current command values determined by the torque command value Tm* in a feedback manner. The operation signal MSt is actually an operation signal for each arm of each leg of the inverter 54.

Figure 3:
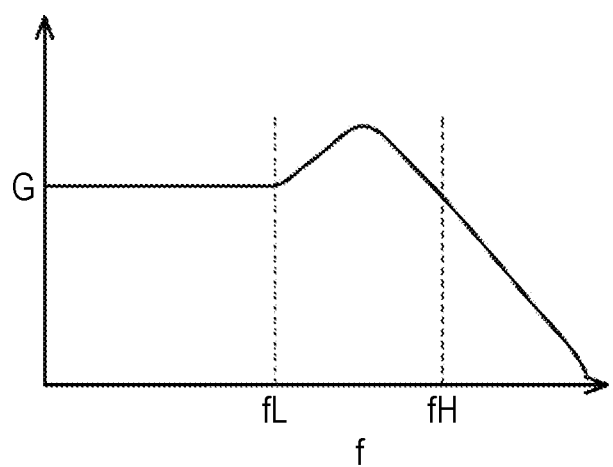
FIG. 3 is a diagram illustrating frequency response characteristics of the steering device according to the first embodiment.

A filtering process M90 is a process of extracting a specific frequency component with the estimated disturbance torque Tlde as an input. A specific frequency component will be described below. FIG. 3 illustrates frequency response characteristics of the steering device 10. Specifically, the horizontal axis represents a frequency and the vertical axis represents a gain G when a displacement such as a change of the turning angle is used as an input of the steering device 10 and the torque of the turning-side electric motor 52 which is a force required for the same displacement is used as an output thereof.

As illustrated in FIG. 3, when the frequency is located between a lower-limit frequency fL and an upper-limit frequency fH, the gain G increases. This attributes to stickiness of the steering device 10. The gain G changes due to a stickiness in an assumed range of stickiness of the steering device 10 depending on a state at that time by controlling the turning-side electric motor 52, and changes to be excessively large or excessively small over the assumed range of stickiness when a mechanical abnormality occurs in the turning actuator 50.

When the frequency is less than the lower-limit frequency fL, the gain G is constant. This attributes to friction of the steering device 10. The gain G changes due to friction in an assumed range of friction of the steering device 10 depending on a state at that time by controlling the turning-side electric motor 52, and changes to be excessively large or excessively small over the assumed range of friction when a mechanical abnormality occurs in the turning actuator 50.

When the frequency is greater than the upper-limit frequency fH, the gain G decreases. This attributes to inertia of the steering device 10. The gain G changes due to inertia in an assumed range of inertia of the steering device 10 depending on a state at that time by controlling the turning-side electric motor 52, and changes to be excessively large or excessively small over the assumed range of inertia when a mechanical abnormality occurs in the turning actuator 50.

In the filtering process M90, a band-pass filter BPF is a process of extracting a stickiness component of the steering device 10 and extracts frequency characteristics between the lower-limit frequency fL and the upper-limit frequency fH to extract characteristics based on stickiness. A low-pass filter LPF is a process of extracting a friction component of the steering device 10 and extracts frequency characteristics less than the lower-limit frequency fL which are less affected by stickiness or inertia to extract characteristics based on friction. A high-pass filter HPF is a process of extracting an inertia component of the steering device 10 and extracts frequency characteristics greater than the upper-limit frequency fH to extract characteristics based on inertia. In extracting the stickiness component, a center frequency transmitted by the band-pass filter BPF is preferably set to, for example, "7 Hz to 9 Hz." The bandwidth is preferably set to, for example, "4 Hz to 6 Hz." In extracting the friction component, a center frequency transmitted by the low-pass filter LPF is preferably set to be less than, for example, "7 Hz." In extracting the inertia component, a center frequency transmitted by the high-pass filter HPF is preferably set to be greater, for example, "9 Hz." In this embodiment, the filtering process M90 is an example of a predetermined component calculating process, the band-pass filter BPF is an example of a stickiness component calculating process, the low-pass filter LPF is an example of a friction component calculating process, and the high-pass filter HPF is an example of an inertia component calculating process.

Referring back to FIG. 2, an abnormality state determining process M92 is a process of detecting a mechanical abnormality of the turning actuator 50 as an abnormality of the steering device 10 based on a stickiness component Tc, a friction component Tf, and an inertia component Tj which are output from the filtering process M90. Specifically, the abnormality state determining process M92 is a process of generating and outputting a warning signal SIG for turning on or off the warning device 80 when a mechanical abnormality of the turning actuator 50 is detected.

Figure 4:
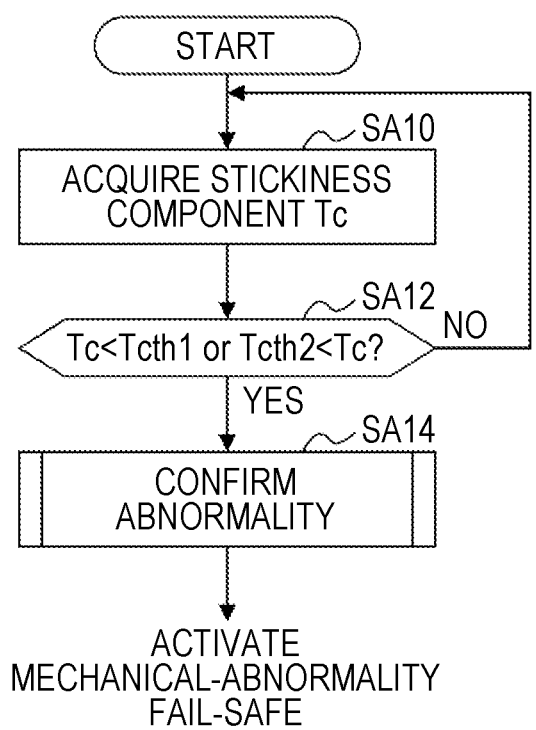
FIG. 4 is a flowchart illustrating a process routine which is performed by the steering control device according to the first embodiment.
Figure 5:
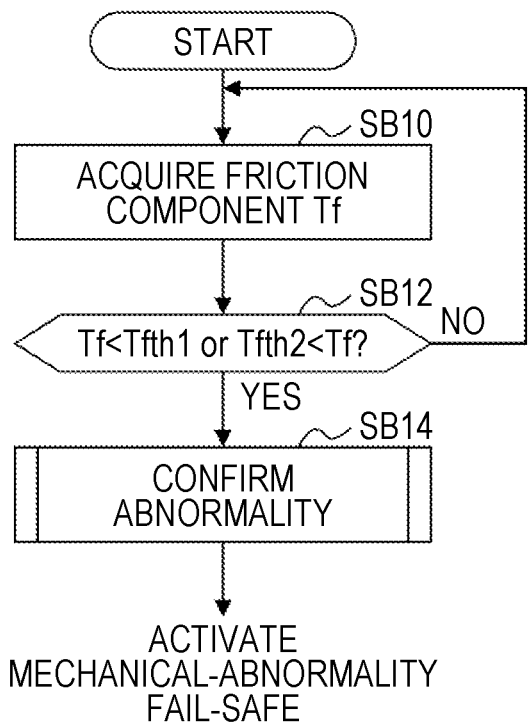
FIG. 5 is a flowchart illustrating a process routine which is performed by the steering control device according to the first embodiment.
Figure 6:
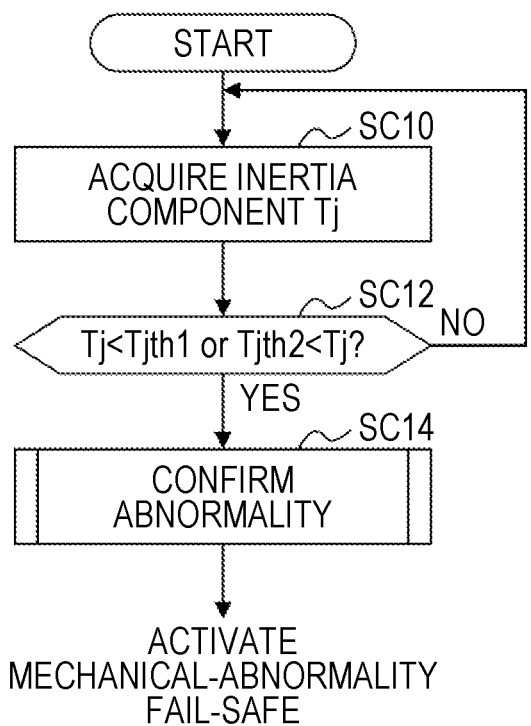
FIG. 6 is a flowchart illustrating a process routine which is performed by the steering control device according to the first embodiment.

FIGS. 4, 5, and 6 illustrate a flow of the abnormality state determining process M92. In the following description, a numeral prefixed with "S" denotes a step number of each process. In a series of processes illustrated in FIG. 4, the CPU 62 first acquires a stickiness component Tc (SA10). Then, the CPU 62 determines whether at least one of a condition that the stickiness component Tc is less than a short stickiness determination value Tcth1 (Tc<Tcth1) and a condition that the stickiness component Tc is greater than an excess stickiness determination value Tcth2 (Tc>Tcth2) is satisfied (Step SA12). This process is for detecting characteristics of the stickiness component Tc indicating that there is a mechanical abnormality in the turning actuator 50. In this embodiment, the short stickiness determination value Tcth1 and the excess stickiness determination value Tcth2 are set to, for example, values in a range which is experimentally acquired by a durability test of a belt of the belt reduction gear mechanism 58 or the like such that a state in which a smooth operation of the belt reduction gear mechanism 58 is difficult is obtained. Specifically, the stickiness component Tc changes based on a traveling state of the vehicle such as the vehicle speed V, a minimum value which is experimentally acquired in the change is set as the short stickiness determination value Tcth1, and a maximum value which is experimentally acquired is set as the excess stickiness determination value Tcth2. In this embodiment, the CPU 62 is an example of a control unit.

When it is determined in Step SA12 that none of a condition that the stickiness component Tc is less than a short stickiness determination value Tcth1 and a condition that the stickiness component Tc is greater than an excess stickiness determination value Tcth2 is satisfied (Step SA12: NO), the CPU 62 determines that a mechanical abnormality has not occurred in the turning actuator 50. Thereafter, the CPU 62 causes the process flow to return to Step SA10 and repeatedly performs the processes subsequent to Step SA10.

On the other hand, when it is determined that at least one of a condition that the stickiness component Tc is less than a short stickiness determination value Tcth1 and a condition that the stickiness component Tc is greater than an excess stickiness determination value Tcth2 is satisfied (Step SA12: YES), the CPU 62 performs a process of confirming a mechanical abnormality of the turning actuator 50 (Step SA14). In Step SA14, the CPU 62 controls a turn-on state such that the warning device 80 is turned on or off to warn a driver of detection of a mechanical abnormality of the turning actuator 50. The CPU 62 records abnormality information indicating that a mechanical abnormality of the turning actuator 50 has been detected in the ROM 64 such that the information indicating that fact is stored. The abnormality information which is recorded in the ROM 64 in this way is output to a diagnostic tool which is not illustrated when the diagnostic tool is externally connected to the steering control device 60. In this embodiment, the ROM 64 has a function of a diagnostics. Thereafter, the CPU 62 performs a process of activating mechanical-abnormality fail-safe as a fail-safe operation. In this embodiment, in the mechanical-abnormality fail-safe, a process of safely stopping the vehicle while warning a driver is performed.

In a series of processes illustrated in FIG. 5, the CPU 62 first acquires a friction component Tf (SB10). Then, the CPU 62 determines whether at least one of a condition that the friction component Tf is less than a short friction determination value Tfth1 (Tf<Tfth1) and a condition that the friction component Tf is greater than an excess friction determination value Tfth2 (Tf>Tfth2) is satisfied (Step SB12). This process is for detecting characteristics of the friction component Tf indicating that there is a mechanical abnormality in the turning actuator 50. In this embodiment, the short friction determination value Tfth1 and the excess friction determination value Tfth2 are set to, for example, values in a range which is experimentally acquired by a durability test of a belt of the belt reduction gear mechanism 58 or the like such that a state in which a smooth operation of the belt reduction gear mechanism 58 is difficult is obtained. Specifically, the friction component Tf basically changes hardly in the entire frequency range and even changes in a tolerance range, a minimum value which is experimentally acquired in the change is set as the short friction determination value Tfth1, and a maximum value which is experimentally acquired is set as the excess friction determination value Tfth2.

When it is determined in Step SB12 that none of a condition that the friction component Tf is less than the short friction determination value Tfth1 and a condition that the friction component Tf is greater than the excess friction determination value Tfth2 is satisfied (Step SB12: NO), the CPU 62 determines that a mechanical abnormality has not occurred in the turning actuator 50. Thereafter, the CPU 62 causes the process flow to return to Step SB10 and repeatedly performs the processes subsequent to Step SB10.

On the other hand, when it is determined that at least one of a condition that the friction component Tf is less than the short friction determination value Tfth1 and a condition that the friction component Tf is greater than the excess friction determination value Tfth2 is satisfied (Step SB12: YES), the CPU 62 performs a process of confirming a mechanical abnormality of the turning actuator 50 (Step SB14). In Step SB14, the CPU 62 performs various processes in the same way as described above in Step SA14.

In a series of processes illustrated in FIG. 6, the CPU 62 first acquires an inertia component Tj (SC10). Then, the CPU 62 determines whether at least one of a condition that the inertia component Tj is less than a short inertia determination value Tjth1 (Tj<Tjth1) and a condition that the inertia component Tj is greater than an excess inertia determination value Tjth2 (Tj>Tjth2) is satisfied (Step SC12). This process is for detecting characteristics of the inertia component Tj indicating that there is a mechanical abnormality in the turning actuator 50. In this embodiment, the short inertia determination value Tjth1 and the excess inertia determination value Tjth2 are set to, for example, values in a range which is experimentally acquired by a durability test of a belt of the belt reduction gear mechanism 58 or the like such that a state in which a smooth operation of the belt reduction gear mechanism 58 is difficult is obtained. Specifically, the inertia component Tj changes based on a traveling state of the vehicle such as the vehicle speed V, a minimum value which is experimentally acquired in the change is set as the short inertia determination value Tjth1, and a maximum value which is experimentally acquired is set as the excess inertia determination value Tjth2.

When it is determined in Step SC12 that none of a condition that the inertia component Tj is less than the short inertia determination value Tjth1 and a condition that the inertia component Tj is greater than the excess inertia determination value Tjth2 is satisfied (Step SC12: NO), the CPU 62 determines that a mechanical abnormality has not occurred in the turning actuator 50. Thereafter, the CPU 62 causes the process flow to return to Step SC10 and repeatedly performs the processes subsequent to Step SC10.

On the other hand, when it is determined that at least one of a condition that the inertia component Tj is less than the short inertia determination value Tjth1 and a condition that the inertia component Tj is greater than the excess inertia determination value Tjth2 is satisfied (Step SC12: YES), the CPU 62 performs a process of confirming a mechanical abnormality of the turning actuator 50 (Step SC14). In Step SC14, the CPU 62 performs various processes in the same way as described above in Step SA14.

Operations in this embodiment will be described below. According to this embodiment, by acquiring a stickiness component Tc, a friction component Tf, and an inertia component Tj included in the estimated disturbance torque Tlde which is calculated while controlling the torque output from the turning-side electric motor 52 via the filtering process M90, it is possible to detect characteristics of the steering device 10 which are represented by controlling the turning-side electric motor 52. When there is a mechanical abnormality in the turning actuator 50 which is operated in association with the operation of the turning-side electric motor 52, these characteristics exhibit different characteristics that the stickiness component Tc, the friction component Tf, or the inertia component Tj is excessively large or excessively small in comparison with a case in which there is no mechanical abnormality. This is also valid in a state in which an abnormality has not been yet reached such as a state in which a mechanical abnormality has not occurred actually in the turning actuator 50 and an abnormality cannot be determined even when mechanical parts of the turning actuator 50 are directly monitored. That is, according to this embodiment, it is possible to indirectly detect a mechanical abnormality of the turning actuator 50 based on characteristics indicated by the stickiness component Tc, the friction component Tf, or the inertia component Tj and to detect an abnormality which cannot be detected even when mechanical parts of the turning actuator 50 are directly monitored.

Advantages of this embodiment will be described below.

(1) In this embodiment, a mechanical abnormality of the turning actuator 50 can be detected based on characteristics indicated by the stickiness component Tc, the friction component Tf, or the inertia component Tj included in the estimated disturbance torque Tlde. Accordingly, before a state in which a smooth operation of the turning actuator 50 is difficult has been reached, it is possible to more appropriately detect a mechanical abnormality of the turning actuator 50 including a symptom thereof.

(2) In this embodiment, the disturbance torque calculating process M62 is to estimate a torque affecting the pinion angle θp as a disturbance torque in addition to the turning operation amount Tt* and to calculate the detected disturbance torque as the estimated disturbance torque Tlde. According to this embodiment, it is possible to calculate the stickiness component Tc, the friction component Tf, or the inertia component Tj using the disturbance torque calculating process M62 in consideration of the fact that the stickiness component Tc, the friction component Tf, or the inertia component Tj is included in the disturbance torque affecting the pinion angle θp which changes by controlling the turning-side electric motor 52 in addition to the turning operation amount Tt*.

(3) In this embodiment, the outputs of the band-pass filter BPF, the low-pass filter LPF, and the high-pass filter HPF of the filtering process M90 are used as the stickiness component Tc, the friction component Tf, and the inertia component Tj in consideration of the fact that the stickiness component Tc, the friction component Tf, or the inertia component Tj becomes significant at a predetermined frequency. Accordingly, it is possible to accurately calculate a target component.

(4) In this embodiment, in consideration of the fact that the stickiness component Tc exhibits different characteristics when there is a mechanical abnormality in the turning actuator 50 in comparison with a case in which there is no mechanical abnormality, the stickiness component Tc is calculated based on the estimated disturbance torque Tlde affecting the pinion angle θp in addition to the turning operation amount Tt*. Accordingly, it is possible to appropriately detect a mechanical abnormality of the turning actuator 50.

(5) In this embodiment, in consideration of the fact that the friction component Tf exhibits different characteristics when there is a mechanical abnormality in the turning actuator 50 in comparison with a case in which there is no mechanical abnormality, the friction component Tf is calculated based on the estimated disturbance torque Tlde affecting the pinion angle θp in addition to the turning operation amount Tt*. Accordingly, it is possible to appropriately detect a mechanical abnormality of the turning actuator 50.

(6) In this embodiment, in consideration of the fact that the inertia component Tj exhibits different characteristics when there is a mechanical abnormality in the turning actuator 50 in comparison with a case in which there is no mechanical abnormality, the inertia component Tj is calculated based on the estimated disturbance torque Tlde affecting the pinion angle θp in addition to the turning operation amount Tt*. Accordingly, it is possible to appropriately detect a mechanical abnormality of the turning actuator 50.

Second Embodiment

A second embodiment will be described below with a focus on differences from the first embodiment with reference to the accompanying drawings.

Figure 7:
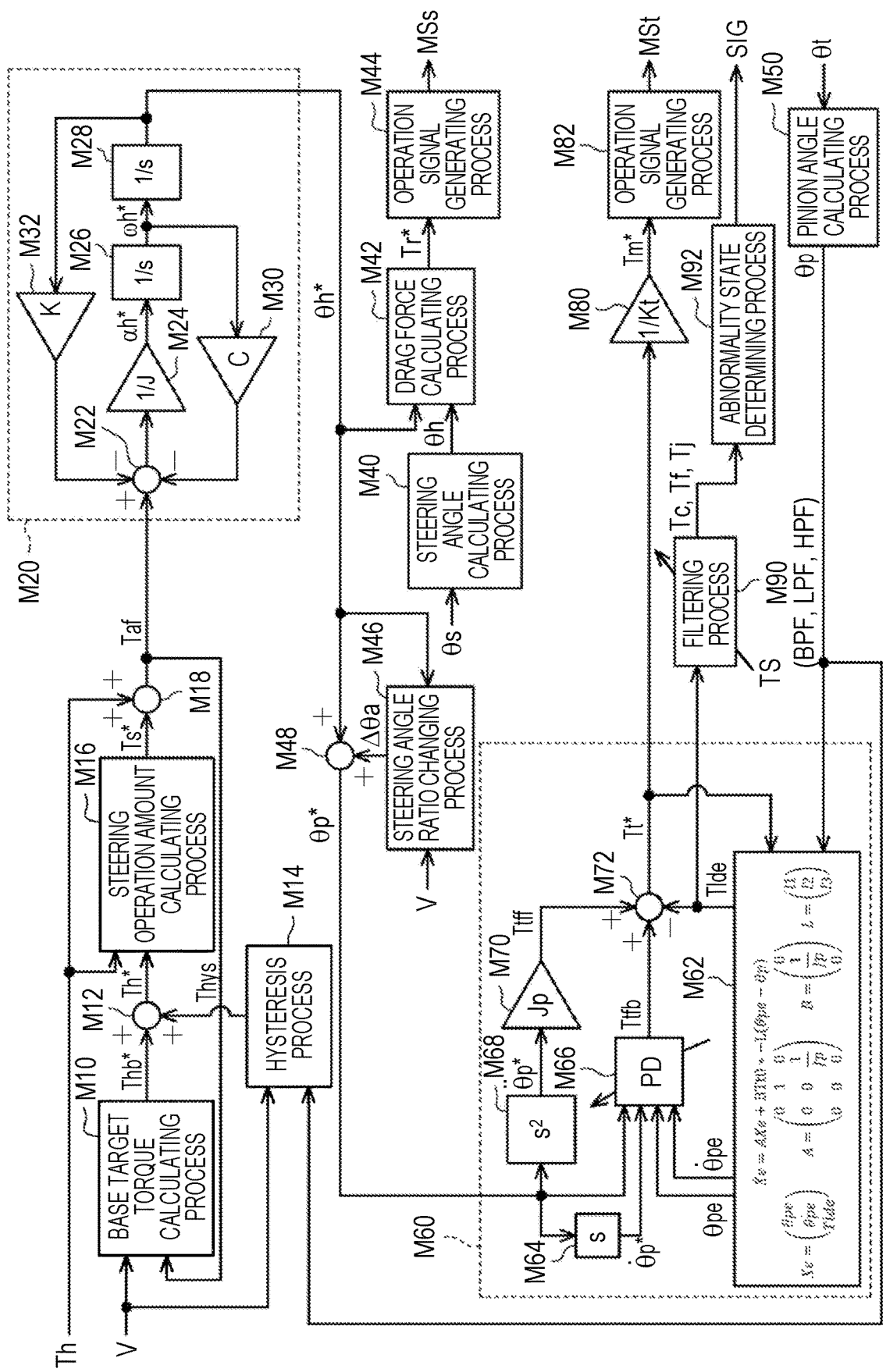
FIG. 7 is a block diagram illustrating processes which are performed by a steering control device according to a second embodiment.

FIG. 7 illustrates processes which are performed by the steering control device 60 according to this embodiment. In FIG. 7, processes corresponding to the processes illustrated in FIG. 2 will be referred to by the same reference signs for the purpose of convenience. As illustrated in FIG. 7, in this embodiment, the CPU 62 sets filter characteristics of the band-pass filter BPF of the filtering process M90 such that they vary depending on a temperature TS. Specifically, the intensity of the stickiness component Tc is set to be greater when the temperature TS is high than when the temperature TS is low.

This is based on consideration of the fact that stiffness of a lubricant such as a grease of the steering device 10 increases and stickiness thereof increases. Since the output value of the band-pass filter BPF is set to be greater when the intensity of the stickiness component included in the estimated disturbance torque Tlde is large than when the intensity of the stickiness component is small, the intensity of the stickiness component Tc which is output from the band-pass filter BPF becomes greater when the temperature TS is low than when the temperature TS is high even if the filter characteristics are not set to be variable. On the other hand, in this embodiment, by setting the filter characteristics to be variable depending on the temperature TS, the intensity of the stickiness component Tc when the temperature TS is low is set to be greater in comparison with the filter characteristics are not set to be variable. In this embodiment, the filtering process M90, that is, the band-pass filter BPF, is an example of an intensity changing process.

According to this embodiment, the following advantages can be achieved in addition to operations and advantages corresponding to the operations and advantages of the first embodiment. (7) In this embodiment, since the intensity of the stickiness component Tc when the temperature TS is lower is set to be greater, it is possible to easily increase a degree of freedom in determination accuracy of the abnormality state determining process M92 based on the output of the filtering process M90 in comparison with a case in which the filter characteristics of the band-pass filter BPF are not set to be variable.

Third Embodiment

A third embodiment will be described below with a focus on differences from the first embodiment with reference to the accompanying drawings.

Figure 8:
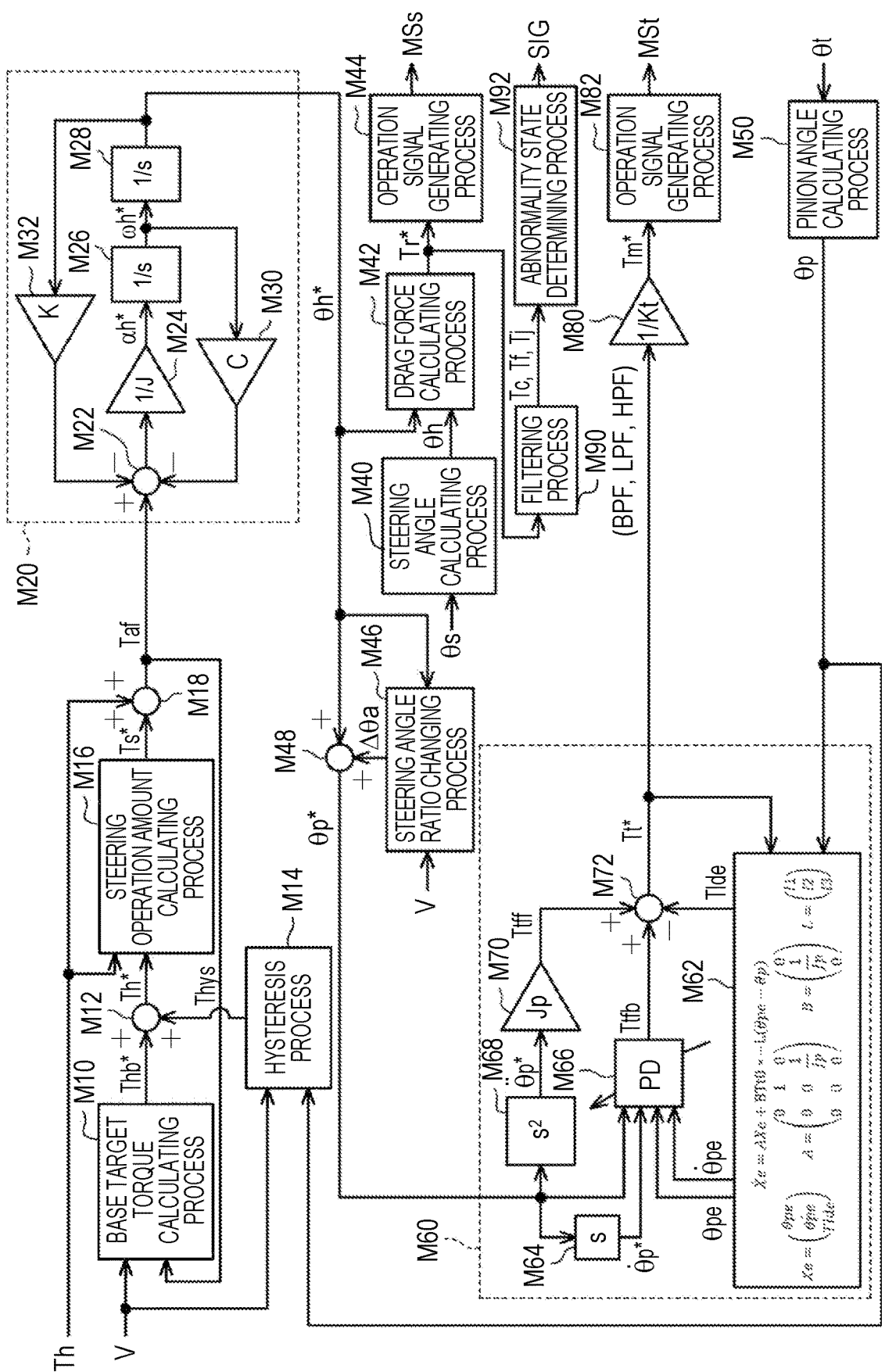
FIG. 8 is a block diagram illustrating processes which are performed by a steering control device according to a third embodiment.

FIG. 8 illustrates processes which are performed by the steering control device 60 according to this embodiment. In FIG. 8, processes corresponding to the processes illustrated in FIG. 2 will be referred to by the same reference signs for the purpose of convenience. As illustrated in FIG. 8, in this embodiment, the filtering process M90 is a process of outputting a stickiness component, a friction component, and an inertia component included in the drag force command value Tr* as the stickiness component Tc, the friction component Tf, and the inertia component Tj with the drag force command value Tr* as an input. The abnormality state determining process M92 is a process of detecting a mechanical abnormality of the drag force actuator 30 based on the stickiness component Tc, the friction component Tf, or the inertia component Tj included in the drag force command value Tr*. In this embodiment, the drag force calculating process M42 is an example of a control value calculating process and a predetermined component calculating process.

Operations in this embodiment will be described below. According to this embodiment, by acquiring a stickiness component Tc, a friction component Tf, and an inertia component Tj included in the drag force command value Tr* which is calculated while controlling the torque output from the steering-side electric motor 36 via the filtering process M90, it is possible to detect characteristics of the steering device 10 which are represented by controlling the steering-side electric motor 36. When there is a mechanical abnormality in the drag force actuator 30 which is operated in association with the operation of the steering-side electric motor 36, these characteristics exhibit different characteristics that the stickiness component Tc, the friction component Tf, or the inertia component Tj is excessively large or excessively small in comparison with a case in which there is no mechanical abnormality. This is also valid in a state in which an abnormality has not been yet reached such as a state in which a mechanical abnormality has not occurred actually in the drag force actuator 30 and an abnormality cannot be determined even when mechanical parts of the drag force actuator 30 are directly monitored. That is, according to this embodiment, it is possible to indirectly detect a mechanical abnormality of the drag force actuator 30 based on characteristics indicated by the stickiness component Tc, the friction component Tf, or the inertia component Tj and to detect an abnormality which cannot be detected even when mechanical parts of the drag force actuator 30 are directly monitored.

Fourth Embodiment

A fourth embodiment will be described below with a focus on differences from the first embodiment with reference to the accompanying drawings.

Figure 9:
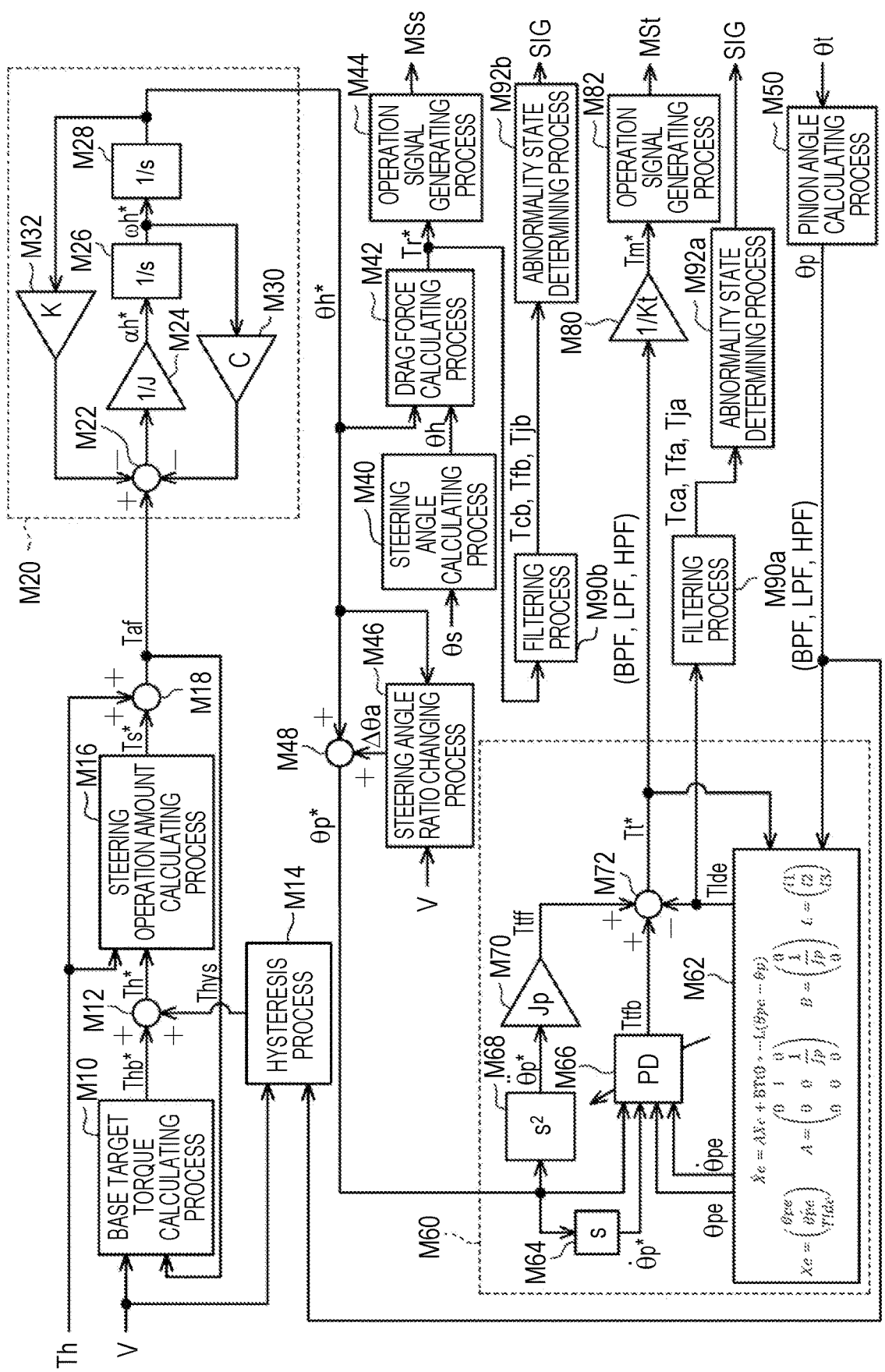
FIG. 9 is a block diagram illustrating processes which are performed by a steering control device according to a fourth embodiment.

FIG. 9 illustrates processes which are performed by the steering control device 60 according to this embodiment. In FIG. 9, processes corresponding to the processes illustrated in FIG. 2 will be referred to by the same reference signs for the purpose of convenience. As illustrated in FIG. 9, in this embodiment, a filtering process M90a is a process of outputting a stickiness component, a friction component, and an inertia component included in the estimated disturbance torque Tlde as the stickiness component Tca, the friction component Tfa, and the inertia component Tja with the estimated disturbance torque Tlde as an input. An abnormality state determining process M92a is a process of detecting a mechanical abnormality of the turning actuator 50 based on the stickiness component Tca, the friction component Tfa, or the inertia component Tja included in the estimated disturbance torque Tlde.

In this embodiment, a filtering process M90b is a process of outputting a stickiness component, a friction component, and an inertia component included in the drag force command value Tr* as the stickiness component Tcb, the friction component Tfb, and the inertia component Tjb with the drag force command value Tr* as an input. An abnormality state determining process M92b is a process of detecting a mechanical abnormality of the drag force actuator 30 based on the stickiness component Tcb, the friction component Tfb, or the inertia component Tjb included in the drag force command value Tr*.

According to this embodiment, in the abnormality state determining process M92a, it is possible to detect a mechanical abnormality of the turning actuator 50 by acquiring characteristics of the steering device 10 which are represented by controlling the operation of the turning-side electric motor 52. In the abnormality state determining process M92b, it is possible to detect a mechanical abnormality of the drag force actuator 30 by acquiring characteristics of the steering device 10 which are represented by controlling the operation of the steering-side electric motor 36. That is, according to this embodiment, it is possible to detect a mechanical abnormality in both of the turning actuator 50 and the drag force actuator 30.

Fifth Embodiment

A fifth embodiment will be described below with a focus on differences from the first embodiment with reference to the accompanying drawings.

Figure 10:
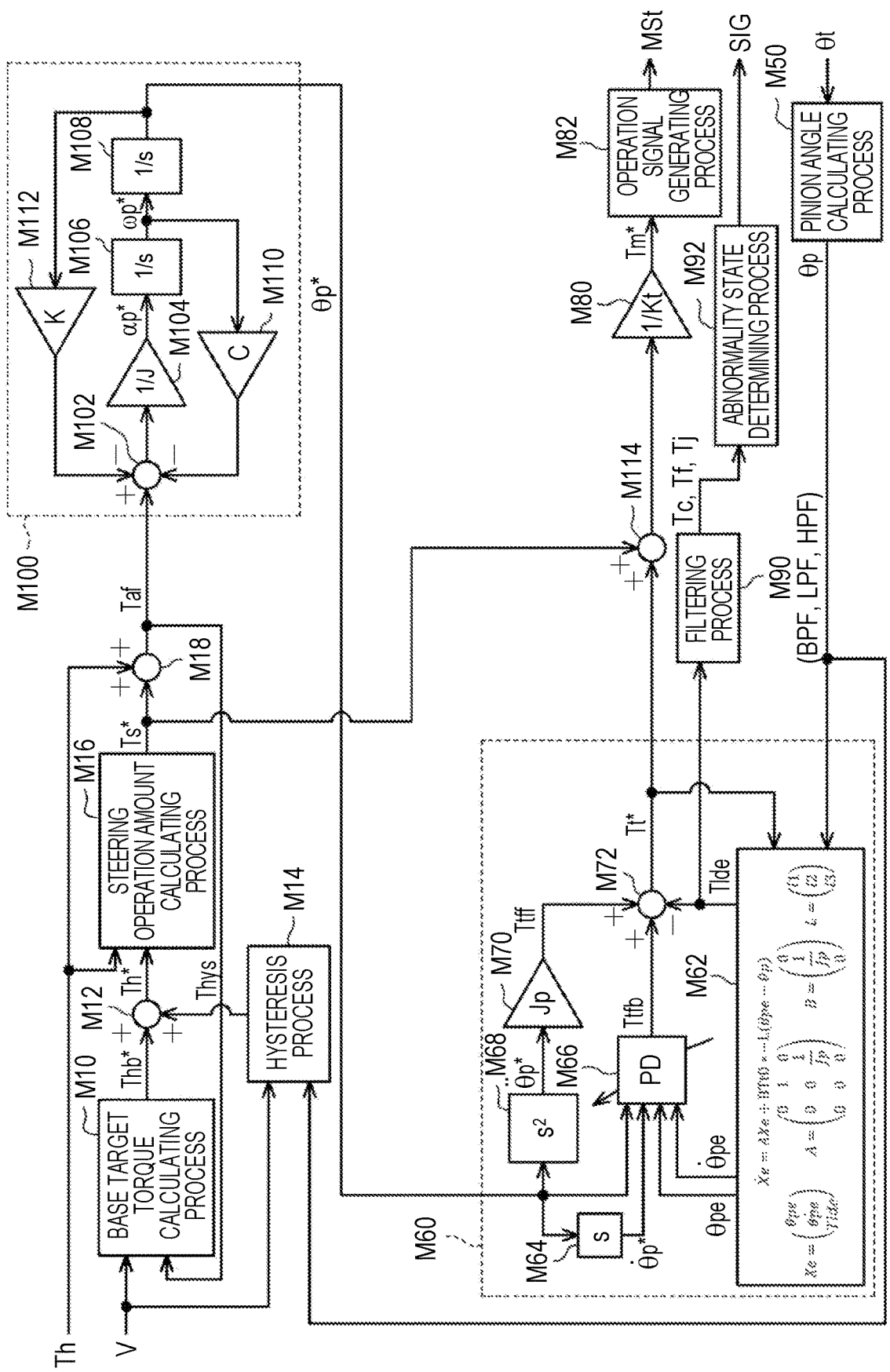
FIG. 10 is a block diagram illustrating processes which are performed by a steering control device according to a fifth embodiment.

FIG. 10 illustrates processes which are performed by the steering control device 60 according to this embodiment. In FIG. 10, processes corresponding to the processes illustrated in FIG. 2 will be referred to by the same reference signs for the purpose of convenience.

In the steering device according to this embodiment, the clutch 24 is omitted in FIG. 1 and the input shaft 32 is mechanically connected to the pinion shaft 26 via a gear ratio changing mechanism with a variable gear ratio instead. That is, a rotational force of the steering wheel 22 is converted to a displacement in the axial direction of the rack shaft 28 and the displacement in the axial direction is transmitted to the turning wheels 42 via the tie rods 40 connected to both ends of the rack shaft 28, whereby the turning angle of the turning wheels 42 is changed.

The steering control device 60 performs control for turning the turning wheels 42 according to the operation of the steering wheel 22 by operating the steering device including a turning actuator 50 that applies an assist force which is a force for assisting with the operation of the steering wheel 22. In this embodiment, a rack assist type electric power steering system is realized by the turning actuator 50, and the steering control device 60 controls a torque which is a control value for the turning-side electric motor 52 by operating the inverter 54 connected to the turning-side electric motor 52. In this embodiment, the turning-side electric motor 52 is an example of an assist electric motor.

A normative model calculating process M100 is a process of calculating a pinion angle command value $\theta p^*$ which is a command value of the pinion angle $\theta p$ based on the axial force Taf. The normative model calculating process M100 is a process of calculating the pinion angle command value $\theta p^*$ using a model formula which is expressed by Expression (c1).

Specifically, in a subtraction process M102, a stickiness term "$C \cdot \theta p^*$" and a spring term "$K \cdot \theta p^*$" are subtracted from the axial force Taf. In an inertia coefficient dividing process M104, the output of the subtraction process M102 is divided by the inertia coefficient J, whereby a turning angular acceleration command value $\alpha p^*$ ($=\theta p^{*\prime\prime}$) is calculated. Then, in an integration process M106 with the turning angular acceleration command value $\alpha p^*$ as an input, a turning angular velocity command value $\omega p^*$ ($=\theta p^{*\prime}$) is calculated. In an integration process M108 with the turning angular velocity command value $\omega p^*$ as an input, the pinion angle command value $\theta p^*$ is calculated.

A stickiness coefficient multiplying process M110 is a process of calculating the stickiness term "$C \cdot \theta p^{*\prime}$" by multiplying the turning angular velocity command value ωp* by the stickiness coefficient C. An elasticity coefficient multiplying process M112 is a process of calculating the spring term "K·θp*" by multiplying the pinion angle command value θp* by the elasticity coefficient K.

An addition process M114 is a process of adding the steering operation amount Ts* to the turning operation amount Tt* which is an output value of the two-degree-of-freedom operation amount calculating process M72 and outputting the calculated steering operation amount Ts*. A conversion process M80 is a process of converting the output value of the addition process M114 to the torque command value Tm* by dividing the output value of the addition process M114 by the reduction gear ratio Kt.

According to the aforementioned embodiment, operations and advantages corresponding to the operations and advantages of the first embodiment are achieved. This embodiment can be modified as follows. This embodiment and the following modified examples can be combined with each other unless a technical confliction arises.

In the first embodiment, a stiffness component for the vehicle in which the steering device 10 is mounted is considered to be included in a frequency area in which the stickiness component Tc is extracted. The stiffness component changes depending on a pneumatic pressure state of the turning wheels 42 of the vehicle or an assembled state of the steering device 10 into the vehicle. Accordingly, an abnormality such as a flat-tire state of the turning wheels 42 or a state in which assembly of the steering device 10 into the vehicle is loosened can be detected using the stickiness component Tc. In this case, a short stiffness determination value or an excess stiffness determination value for used for the stickiness component Tc can be set. This is the same in the second, third, and fifth embodiments in which a mechanical abnormality of the turning actuator 50 can be detected.

In the first embodiment, at least one of the stickiness component Tc, the friction component Tf, and the inertia component Tj has only to be used to detect a mechanical abnormality of the turning actuator 50 and the components can be appropriately changed, for example, only the stickiness component Tc is used or the stickiness component Tc and the friction component Tf are used. When the stickiness component Tc and the friction component Tf are used, a mechanical abnormality of the turning actuator 50 may be detected through comparison a difference therebetween with a determination value. When only the stickiness component Tc is used, characteristics of a range including the stickiness component may be extracted by the low-pass filter LPF or the high-pass filter HPF. When the stickiness component is extracted by the low-pass filter LPF, the extracted component includes a friction component. When the stickiness component is extracted by the high-pass filter HPF, the extracted component includes an inertia component. This description is true of the second to fifth embodiments.

In the first embodiment, the determination method of the abnormality state determining process M92 can be appropriately changed to, for example, determining previous values and current values or an amount of change thereof in a predetermined sampling period using the stickiness component Tc, the friction component Tf, or the inertia component Tj. In addition, the determination method may include counting the number of times the determination results of Steps SA12, SB12, and SC12 are YES and determining the result of counting.

In the second embodiment, filter characteristics may be changed such that the stickiness component Tc is less when the temperature TS is low than when the temperature TS is high, and the changed mode of the filter characteristics is not particularly limited. In the second embodiment, in the process of changing the filter characteristics depending on the temperature TS, filter characteristics of the low-pass filter LPF or the high-pass filter HPF may be changed.

In the second embodiment, for example, a temperature which is estimated from a history of currents flowing in the turning-side electric motor 52 or the steering-side electric motor 36 may be used as the temperature which is input at the time of changing the filter characteristics. A temperature which is estimated from the history of currents flowing in components in the steering control device 60 may be used. A detection value of a sensor that detects an outside air temperature may be used to estimate the temperature.

In the first embodiment, the disturbance torque calculating process M62 may be used to calculate the stickiness component Tc, the friction component Tf, or the inertia component Tj but may not be used to calculate the turning operation amount Tt*. This is true of the second, fourth, and fifth embodiments in which a mechanical abnormality of the turning actuator 50 can be detected.

In the first embodiment, the disturbance torque calculating process constituted by an observer may use, for example, a nonlinear Kalman filter such as an extended Kalman filter (EKF), an unscented Kalman filter (UKF), or an ensemble Kalman filter (EnKF). This is true of the second to fifth embodiments.

In the first embodiment, for example, when feedback control of a feedback control value to the pinion angle command value θp* which is a command value is performed, the stickiness component Tc, the friction component Tf, or the inertia component Tj may be extracted by selectively transmitting a specific frequency component of a torque command value or a current command value such as the turning operation amount Tt* which is an operation amount thereof. In consideration of the fact that a current is controlled to a command value, the stickiness component Tc, the friction component Tf, or the inertia component Tj may be extracted by selectively transmitting a specific frequency component of a current flowing actually in the turning-side electric motor 52 when feedback control of a feedback control value to the pinion angle command value θp* which is a command value is performed. In addition, since the torque or the current which is an operation amount for angle feedback control for the turning angle is a control value for the turning-side electric motor 52, a command value thereof in addition to the torque or the current is a variable associated with the control value for the turning-side electric motor 52. This is true of the second, fourth, and fifth embodiments in which a mechanical abnormality of the turning actuator 50 can be detected.

In the third embodiment, for example, when feedback control of a feedback control value such that it becomes the steering angle command value θh* which is a command value is performed, the stickiness component Tc, the friction component Tf, or the inertia component Tj may be extracted by selectively transmitting a specific frequency component of a current command value in the operation signal generating process M44. In addition, since the torque or the current which is an operation amount for angle feedback control for the steering angle is a control value for the steering-side electric motor 36, a command value thereof in addition to the torque or the current is a variable associated with the control value for the steering-side electric motor 36. The drag force calculating process M42 may be constituted by a process of calculating a feed-forward term and a feedback term and a process of calculating a disturbance torque and the stickiness component Tc, the friction component Tf, or the inertia component Tj may be extracted from the disturbance torque. The disturbance torque may not be used to calculate the drag force command value Tr* and the disturbance torque may be calculated to calculate the stickiness component Tc, the friction component Tf, or the inertia component Tj. This is true of the fourth embodiment.

In the aforementioned embodiments, the feed-forward term Ttff may be calculated, for example, based on the second-order time differential value of the pinion angle θp or may be calculated based on the second-order time differential value of the estimated value θpe.

In the aforementioned embodiments, the feed-forward term may be calculated, for example, using a model in which a torque acting on the turning wheels 42 is balanced with a sum of a torque proportional to the angular acceleration of the turning angle and stickiness which is the torque proportional to the angular velocity of the turning angle. In this case, the disturbance torque calculating process M62 can be constructed using the model in which a torque acting on the turning wheels 42 is balanced with a sum of a torque proportional to the angular acceleration of the turning angle and the stickiness component.

In the aforementioned embodiments, for example, the pinion angle θp or a time differential value thereof may be used instead of the estimated value ∂pe or a first-order time differential value as a feedback control value of the input of the feedback term calculating process M66.

In the aforementioned embodiments, for example, an output value of a proportional element may be output or an output value of a differential element may be output in the feedback term calculating process M66. In addition, the feedback term calculating process M66 may be a process of outputting a sum of at least one of the output value of the proportional element and the output value of the differential element and an output value of an integral element. When the output value of the integral element is used, it is preferable that the disturbance torque calculating process M62 be deleted. When the output value of the integral element is not used, use of the disturbance torque calculating process M62 is not essential.

In the aforementioned embodiments, the steering angle ratio changing process M46 and the addition process M48 may be deleted and the output of the normative model calculating process M20 may be used as both the steering angle command value θh* and the pinion angle command value θp*.

In the aforementioned embodiments, the steering angle command value θh* is calculated using Expression (c1) with the axial force Taf as an input, but a logic (model) for calculating the steering angle command value θh* is not limited thereto.

In the aforementioned embodiments, a configuration in which the drag force calculating process M42 is deleted and, for example, the steering operation amount Ts* is input to the operation signal generating process M44 may be used to control the steering-side electric motor 36.

In the aforementioned embodiments, feedback control of the steering torque Th is not essential, and, for example, an assist torque may be calculated based on the steering torque Th, a value obtained by correcting the assist torque in various forms may be set as the steering operation amount Ts*, and the steering operation amount Ts* may be input to the operation signal generating process M44.

In the aforementioned embodiments, for example, the turning angle of the turning wheels 42 may be used as the convertible angle of the rotational angle of the turning-side electric motor 52. In the aforementioned embodiments, for example, the rotational angle of the steering-side electric motor 36 may be used as the convertible angle of the rotational angle of the steering-side electric motor 36.

In the aforementioned embodiments, for example, the steering operation amount Ts* may be set to a torque of the steering-side electric motor 36. In this case, a sum of a value obtained by dividing the steering torque Th by the reduction gear ratio and the steering operation amount Ts* may be used as the axial force Taf or a sum of a value obtained by multiplying the steering operation amount Ts* by the reduction gear ratio and the steering torque Th may be used as the axial force Taf.

In the aforementioned embodiments, the turning operation amount Tt* may be used, for example, as the torque of the turning-side electric motor 52. In the aforementioned embodiments, the process of calculating the base target torque Thb* based on only the axial force Taf may be used as the base target torque calculating process M10.

In the aforementioned embodiments, the process of correcting the base target torque Thb* using the hysteresis correction amount Thys is not necessarily performed. In the aforementioned embodiments, for example, the electric motors 36 and 52 may be an IPMSM or an induction machine. In addition, the electric motors 36 and 52 may be a direct-current electric motor with a brush. In this case, an H-bridged circuit may be employed as the drive circuit.

In the aforementioned embodiments, for example, a so-called dual pinion type including a second pinion shaft that transmits power of the turning-side electric motor 52 to the rack shaft 28 separately from the pinion shaft 26 may be employed as the turning actuator 50.

In the aforementioned embodiments, the rack shaft 28 is supported to be movable in the axial direction thereof and pressed to the pinion shaft 26 by a support mechanism (not illustrated) which is provided in the turning actuator 50. Accordingly, the rack shaft 28 is movably supported and rotation in the circumferential direction thereof is restricted. Another support mechanism that movably supports the rack shaft 28 without using the pinion shaft 26 may be provided. In this case, the pinion shaft 26 may be omitted in the turning actuator 50.

In the aforementioned embodiments, when any one of the short stickiness determination value Tcth1 and the excess stickiness determination value Tcth2 has only to be considered from the viewpoint of detecting a target mechanical abnormality, the other determination value may be deleted and this configuration can be appropriately modified. This is true of the short friction determination value Tfth1 and the excess friction determination value Tfth2 or the short inertia determination value Tjth1 and the excess inertia determination value Tjth2.

In the aforementioned embodiments, warning for a driver using the warning device 80 can be appropriately modified, for example, as long as the driver can be aware of change of a situation such as warning the driver using a sound such as an alarm sound or tightening the operation of the steering wheel 22 by increasing a drag force. In addition to warning a driver, for example, a shop in which maintenance of a vehicle is possible such as a dealer closest to a current position or a nearby dealer may be informed using a communication function of the vehicle.

In the aforementioned embodiments, the steering control device 60 is not limited to a device that includes the CPU 62 and the ROM 64 and performs software processes. For example, a dedicated hardware circuit (for example, an ASIC) that performs at least a part of the software processes performed in the aforementioned embodiments in hardware may be provided. That is, the steering control device 60 may have at least one of the following configurations of (a) to (c). (a) A processor that performs all the processes in accordance with a program and a program storage device such as a ROM that stores the program are provided. (b) A processor that performs some of the processes in accordance with a program, a program storage device, and a dedicated hardware circuit that performs the other processes are provided. (c) A dedicated hardware circuit that performs all the processes is provided. Here, the number of software processing circuits including a processor and a program storage device or the number of dedicated hardware circuits may be two or more. That is, the processes has only to be performed by a processing circuit including at least one side of one or more software processing circuits and one or more dedicated hardware circuits.

Technical ideas which can be understood from the aforementioned embodiments and modified examples will be added below. The steering device includes a steering wheel that can be displaced without transmitting power to the turning wheels, and the electric motor is a turning-side electric motor that turns the turning wheels.

With this configuration, a mechanical abnormality of a mechanism that transmits power to the turning wheels in the steering device can be detected. Accordingly, it is possible to detect a mechanical abnormality of the mechanism that transmits power to the turning wheels in a so-called steer-by-wire steering device.

The steering device includes a steering wheel that can be displaced without transmitting power to the turning wheels, and the electric motor is a steering-side electric motor that applies a torque against a displacement of the steering wheel.

With this configuration, a mechanical abnormality of a mechanism associated with the steering wheel in the steering device can be detected. Accordingly, it is possible to detect a mechanical abnormality of the mechanism associated with the steering wheel in a so-called steer-by-wire steering device.

The steering device may include a steering wheel that can be displaced to transmit power to the turning wheels, and the electric motor may be an assist electric motor that applies a torque for assisting with the operation of the steering wheel to turn the turning wheels.

With the aforementioned configurations, it is possible to appropriately detect a mechanical abnormality of a steering device. Accordingly, it is possible to detect a mechanical abnormality of a so-called electric power steering device.

What is claimed is:

1. A steering control device that controls a steering device that turns turning wheels of a vehicle and includes an electric motor, the steering control device comprising:
  a control unit configured to control an operation of the steering device by controlling the electric motor, the control unit being configured to perform:
    a control value calculating process of calculating a control value for controlling the electric motor,
    a predetermined component calculating process of calculating a predetermined component indicating characteristics of the steering device which are exhibited by controlling the electric motor using a value of a variable associated with the control value as an input, wherein:
      the predetermined component calculating process includes a disturbance torque calculating process of using a value of a variable associated with a torque which is output from the electric motor and a value of a state variable of the steering device which changes by controlling the electric motor as the value of the variable associated with the control value and calculating a torque component which affects the state variable except the torque output from the electric motor as a disturbance torque, and
      the predetermined component calculating process includes a filtering process of using the disturbance torque as an input and selectively transmitting a specific frequency component of the disturbance torque, and uses an output of the filtering process as the predetermined component, and
    an abnormality state determining process of determining whether a mechanical abnormality has occurred in the steering device based on the predetermined component calculated in the predetermined component calculating process.

2. The steering control device according to claim 1, wherein the filtering process includes an intensity changing process of changing an intensity of the output of the filtering process depending on a temperature of the steering device but with the same input of the filtering process.

3. The steering control device according to claim 1, wherein the predetermined component calculating process includes a stickiness component calculating process of calculating a stickiness component of the steering device as the predetermined component.

4. The steering control device according to claim 1, wherein the predetermined component calculating process includes a friction component calculating process of calculating a friction component of the steering device as the predetermined component.

5. The steering control device according to claim 1, wherein the predetermined component calculating process includes an inertia component calculating process of calculating an inertia component of the steering device as the predetermined component.

* * * * *